US 8,305,557 B2

(12) United States Patent
Hong

(10) Patent No.: US 8,305,557 B2
(45) Date of Patent: Nov. 6, 2012

(54) SYSTEM FOR CALCULATING TRANSMISSION UTILITY FACTOR VALUE OF PHOTO ENERGY FOR EXPOSURE AND METHOD FOR CALCULATING TRANSMISSION UTILITY FACTOR VALUE OF PHOTO ENERGY UTILIZING THE CALCULATION SYSTEM

(75) Inventor: Woon-Sig Hong, Gwangju-Si (KR)

(73) Assignee: Cymer Korea Inc., Pyungtaek (KR)

( * ) Notice: Subject to any disclaimer, the term of this patent is extended or adjusted under 35 U.S.C. 154(b) by 759 days.

(21) Appl. No.: 11/987,226

(22) Filed: Nov. 28, 2007

(65) Prior Publication Data
US 2008/0143988 A1  Jun. 19, 2008

(30) Foreign Application Priority Data
Dec. 15, 2006 (KR) .................... 10-2006-0128895

(51) Int. Cl.
*A61N 5/00* (2006.01)
*G03B 27/32* (2006.01)
*G03B 27/54* (2006.01)
(52) U.S. Cl. .................... 355/67; 250/492.2; 355/77
(58) Field of Classification Search ............... 250/492.2, 250/492.22; 355/30, 53, 67, 68, 77; 372/25, 372/29.01, 29.011, 29.014, 29.02, 33
See application file for complete search history.

(56) References Cited

U.S. PATENT DOCUMENTS

2001/0020195 A1* 9/2001 Patel et al. .................. 700/121
2008/0083885 A1* 4/2008 Wilhelmus Van Herpen et al. .................. 250/493.1

* cited by examiner

*Primary Examiner* — Hung Henry Nguyen
*Assistant Examiner* — Colin Kreutzer
(74) *Attorney, Agent, or Firm* — Birch, Stewart, Kolasch & Birch, LLP

(57) ABSTRACT

Disclosed is a system for calculating transmission utility factor value of photo energy for exposure and a method for calculating transmission utility factor value of photo energy utilizing the calculation system in which the photo energy generated from an excimer laser generator passes various optical systems (which include a lens and a reflection mirror and so on), the photo energy used for exposing a wafer is divided by the photo energy generated from the excimer laser generator and the percentage of the result is finally calculated at real time. According to the present invention, an increase of the exposing time due to the lowering of the photo transmission utility factor value and a lowering of productivity in semiconductor are prevented. According to the present invention, the badness or contamination of the optical systems between the excimer laser generator and the exposure device can be also predicted at real time.

18 Claims, 1 Drawing Sheet

SYSTEM FOR CALCULATING TRANSMISSION UTILITY FACTOR VALUE OF PHOTO ENERGY FOR EXPOSURE AND METHOD FOR CALCULATING TRANSMISSION UTILITY FACTOR VALUE OF PHOTO ENERGY UTILIZING THE CALCULATION SYSTEM

BACKGROUND OF THE INVENTION

1. Field of the Invention

The present invention relates to a system for calculating transmission utility factor value of photo energy for exposure and a method for calculating transmission utility factor value of photo energy utilizing the calculation system, and more particularly, to a system for calculating transmission utility factor value of photo energy for exposure and a method for calculating transmission utility factor value of photo energy utilizing the calculation system in which the photo energy generated from an excimer laser generator passes various optical systems (which include a lens and a reflection mirror and so on), the photo energy used for exposing a wafer is divided by the photo energy generated from the excimer laser generator and the percentage of the result is finally calculated at real time. According to the present invention, an increase of the exposing time due to the lowering of the photo transmission utility factor value and a lowering of productivity in semiconductor are prevented. According to the present invention, the badness or contamination of the optical systems between the excimer laser generator and an exposure device can be also predicted at real time.

2. Description of the Related Art

Generally, an exposure device uses an excimer laser as a deep UV light source. The light generated from an excimer laser generator is processed and transmitted by means of various optical systems (which include a lens and a reflection mirror and so on) and then passes through a mask reticle having circuit patterns. The passed light is finally irradiated on a wafer with the coated photo resist so that patterns on the mask are transferred to the wafer.

At this time, the photo energy of the light generated from the excimer laser generator is lowered according to the distance of the light path until the exposure device and the photo transmission utility factor value of various optical systems.

However, there are several disadvantages that when the light transmission utility factor value is low, the exposure device needs the light source with higher output in order to compensate the lower utility factor value, so that it causes the direct damage to the lifetime of several optical elements and when an exposure process of the wafer is performed by means of low photo energy, the exposure time is increased because of low photo transmission utility factor value and the productivity of a semiconductor is decreased.

Accordingly, it is important to monitor continuously the photo transmission utility factor value between the light source and the exposure device when exposing the wafer and to prevent the loss due to the lowering of the photo transmission utility factor value. However, there is a disadvantage that in the conventional art, the total consideration about the efficiency of the entire light path has not performed at real time.

SUMMARY OF THE INVENTION

Therefore, the present invention has been made in view of the above mentioned problems, and an object of the invention is to provide a system for calculating transmission utility factor value of photo energy for exposure and a method for calculating transmission utility factor value of photo energy utilizing the calculation system in which the photo energy generated from an excimer laser generator passes various optical systems, the photo energy used for exposing a wafer is divided by the photo energy generated from the excimer laser generator and the percentage of the result is finally calculated at real time.

Another object of the invention is to provide a system for calculating transmission utility factor value of photo energy for exposure and a method for calculating transmission utility factor value of photo energy utilizing the calculation system in which an increase of the exposing time due to the lowering of the photo transmission utility factor value and a lowering of productivity in semiconductor are prevented and simultaneously, the badness or contamination of the optical systems between the excimer laser generator and an exposure device is predicted at real time.

In accordance with one aspect, the present invention provides a system for calculating a transmission utility factor value of photo energy for exposure including: an excimer laser generator for generating the excimer laser photo energy main body; an exposure device for receiving the excimer laser photo energy generated by the excimer laser generator through an optical system including a lens and a reflection mirror and so on and for exposing a unit exposure area of a wafer; a data server for receiving the excimer laser photo energy value generated by the excimer laser generator through a network line, for simultaneously receiving the exposure energy value used in order to expose the unit exposure area at the exposure device through the network line, and for multiplying 100 by the value in which the exposure energy value used for exposing the unit exposure area is divided by the excimer laser photo energy value generated from the excimer laser, thereby calculating the photo transmission utility factor value at real time; and a control room server for receiving the photo transmission utility factor value calculated from the data server through the network line in order to predict the badness or contamination of an optical system installed between the excimer laser generator and the exposure device.

In accordance with another aspect, the present invention provides a method for calculating a transmission utility factor value of photo energy for exposure utilizing a system for calculating a transmission utility factor value of photo energy for exposure including the steps of: calculating a unit exposure area of a cell by calculating horizontal and vertical values of the unit exposure area of the cell on a wafer from the exposure device; calculating the photo energy value for exposing the unit exposure area calculated by the unit exposure area of the cell calculation step of the cell; calculating the total laser pulses generated from an excimer laser generator in order to expose the corresponding unit exposure area of the wafer and the energy value of each pulse after the photo energy value calculation step for exposing; and calculating the photo energy transmission utility factor value by comparing the energy value of the excimer laser generator at an initial point of the optical system calculated by the energy value calculation step of each pulse with that of the exposure device at the finish point thereof.

BRIEF DESCRIPTION OF THE DRAWINGS

The above objects, and other features and advantages of the present invention will become more apparent after a reading of the following detailed description when taken in conjunction with the drawings, in which.

DESCRIPTION OF THE PREFERRED EMBODIMENTS

Now, the present invention will be described in detail with reference to the annexed drawings.

Figure 1:
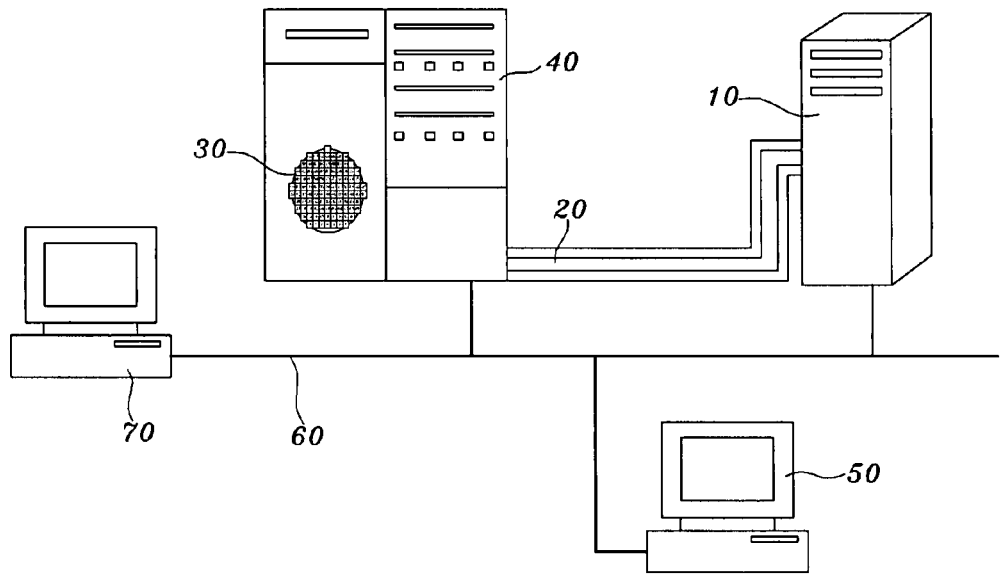
FIG. 1 is a view schematically illustrating a transmission utility factor value of photo energy according to an embodiment of the present invention.
Figure 2:
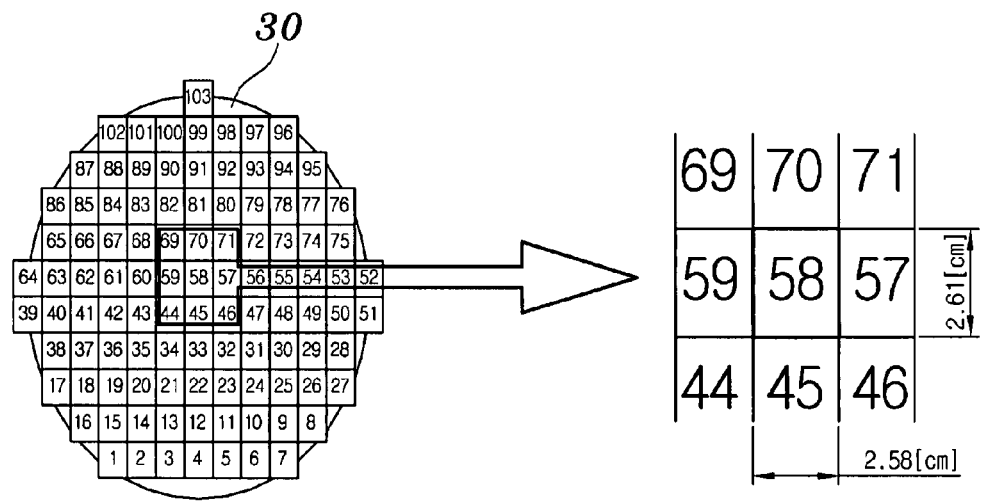
FIG. 2 is a view schematically illustrating a wafer in which a unit area thereof is exposed by receiving the photo energy generated from an excimer laser generator through an optical system in the embodiment of the present invention.

FIG. 1 is a view schematically illustrating a transmission utility factor value of photo energy according to an embodiment of the present invention. FIG. 2 is a view illustrating a wafer in which a unit area thereof is exposed by receiving the photo energy generated from an excimer laser generator in the embodiment of the present invention.

As shown in FIGS. 1 and 2, a system for calculating a transmission utility factor value of photo energy for exposure includes an excimer laser generator 10 for generating the excimer laser photo energy, an exposure device 40 for receiving the excimer laser photo energy generated by the excimer laser generator 10 through an optical system 20 including a lens and a reflection mirror and so on and for exposing a unit exposure area (which may be called as a shot or a cell) of a wafer 30, a data server 50 for receiving the excimer laser photo energy value generated by the excimer laser generator 10 through a network line 60, for simultaneously receiving the exposure energy value used in order to expose the unit exposure area at the exposure device 40 through the network line 60, and for multiplying 100 by the value in which the exposure energy value used for exposing the unit exposure area is divided by the excimer laser photo energy value generated from the excimer laser generator 10, thereby calculating the photo transmission utility factor value at real time, and a control room server 70 for receiving the photo transmission utility factor value calculated from the data server 50 through the network line 60 in order to predict the badness or contamination of an optical system 20 installed between the excimer laser generator 10 and the exposure device.

The network line 60 is connected with the excimer laser generator 10, the exposure device 40 and the data server 50, respectively so that the photo transmission utility factor value calculated at the data server 50 is transmitted to the control room server 70.

As shown in FIG. 2, areas divided with a rectangular shape in the wafer 30 mean each cell and the number on the cell means the cell number.

Now, the operation and effect of a system for calculating the photo energy transmission utility factor value for exposure according to an embodiment of the present invention will be described.

Firstly, the horizontal and vertical values of the unit exposure area of a wafer are calculated from the exposure device 40 and the photo energy value applied to the corresponding unit exposure area is calculated and simultaneously the total laser pulses generated from the excimer laser generator 10 in order to expose the corresponding unit exposure area of the wafer 30 and the energy value of each pulse are calculated.

The energy value of the excimer laser generator 10 at an initial point of the calculated optical system 20 is compared with that of the exposure device 40 at the finish point thereof so that the photo energy transmission utility factor value is calculated.

For example, as shown in FIG. 2, when the unit exposure area of the 58-th cell of the wafer 30 calculated from the exposure device 40 is calculated by the horizontal length× vertical length=2.58 cm×2.61 cm, the energy value for exposing the corresponding unit exposure area is 55.4 mJ/cm$^2$, the number of the laser pulses generated in order to expose the corresponding unit exposure area from the excimer laser generator 10 is 290, the energy of each pulse is 7.5 mJ, 7.48 mJ, . . . , 7.51 mJ, 7.47 mJ and so on, the total sum of the entire energy of 290 pulses is 2170 mJ, the energy used to expose the unit exposure area of the 58-th cell on the wafer 30 is 55.4 mJ/cm$^2$×2.58 cm×2.61 cm=373.05252 mJ.

According to this, since the total energy value of 290 pluses generated from the excimer laser generator 10 in order to produce the exposure energy of 55.4 mJ/cm$^2$ used for exposing the unit area of the 58-th cell is 2170 mJ, the total photo energy transmission utility factor value is calculated as follows:

(Energy used to expose the unit exposure area of the 58-th cell on the wafer 30)÷(Total energy value of 290 pluses generated at the excimer laser generator 10)×100=373.05252÷2170×100=17.2%.

As described above, the calculated photo transmission utility factor value is stored in the data server 50 and simultaneously the calculated photo transmission utility factor value from the data server 50 at real time is outputted to the control room server 70 through the network line 60, respectively.

The photo transmission utility factor value calculated by the data server 50 is compared with the initial value when installing the exposure device 40 and then when the photo transmission utility factor value is decreased above a constant ratio (10%, 20% or 30%), it is discriminated that the optical system 20 is contaminated.

As apparent from the above description, the system for calculating transmission utility factor value of photo energy for exposure and the method for calculating transmission utility factor value of photo energy utilizing the calculation system according to the present invention have several advantages that the photo energy generated from the excimer laser generator passes various optical systems, the photo energy used for exposing a wafer is divided by the photo energy generated from the excimer laser generator and the percentage of the result can be finally calculated at real time. According to the present invention, an increase of the exposing time due to the lowering of the photo transmission utility factor value and a lowering of productivity in semiconductor also can be prevented and also, the badness or contamination of the optical system between the excimer laser and the exposing apparatus can be predicted.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A method for calculating a transmission utility factor value of photo energy of an exposure device, the method comprising the steps of:
    dividing a wafer into a plurality of cells;
    calculating an area of one of the cells by multiplying horizontal and vertical values of the cell;
    exposing the cell with a laser;
    calculating an energy value used to expose the cell by multiplying the area of the cell by an energy value to expose a unit exposure area;

calculating a total number of laser pulses generated from a laser generator in order to expose the cell;

calculating an energy value of each pulse;

multiplying the total number of laser pulses by the energy value of each pulse to determine an energy value generated by the laser to expose the cell;

calculating a photo energy transmission utility factor value by comparing the energy value used to expose the cell with the energy value generated by the laser to expose the cell;

comparing the photo energy transmission utility factor value with a preset value; and determining that the optical system is contaminated when the photo energy transmission utility factor value decreases from the preset value by more than a preset amount.

2. The method for calculating a transmission utility factor value of photo energy for exposure according to claim 1, wherein:

the preset amount is 10%.

3. The method for calculating a transmission utility factor value of photo energy for exposure according to claim 1, wherein:

the preset amount is 20%.

4. The method for calculating a transmission utility factor value of photo energy for exposure according to claim 1, wherein:

the preset amount is 30%.

5. The method for calculating a transmission utility factor value of photo energy for exposure according to claim 1, further comprising calculating the energy value used to expose the cell with a server.

6. The method for calculating a transmission utility factor value of photo energy for exposure according to claim 1, further comprising:

determining the preset value by measuring the energy needed to expose a cell at an initial installation of the exposure device.

7. A method for calculating a transmission utility factor value of photo energy of an exposure device, the method comprising the steps of:

dividing a wafer into a plurality of cells;

calculating an area of one of the cells by multiplying horizontal and vertical values of the cell;

exposing the cell with a laser;

calculating an energy value used to expose the cell by multiplying the area of the cell by an energy value to expose a unit exposure area;

determining an energy value generated by the laser to expose the cell;

calculating a photo energy transmission utility factor value by comparing the energy value used to expose the cell with the energy value generated by the laser to expose the cell;

comparing the photo energy transmission utility factor value with a preset value; and determining that the optical system is contaminated when the photo energy transmission utility factor value decreases from the preset value by more than a preset amount.

8. The method for calculating a transmission utility factor value of photo energy for exposure according to claim 7, wherein:

the preset amount is 10%.

9. The method for calculating a transmission utility factor value of photo energy for exposure according to claim 7, wherein:

the preset amount is 20%.

10. The method for calculating a transmission utility factor value of photo energy for exposure according to claim 7, wherein:

the preset amount is 30%.

11. The method for calculating a transmission utility factor value of photo energy for exposure according to claim 7, further comprising calculating the energy value used to expose the cell with a server.

12. The method for calculating a transmission utility factor value of photo energy for exposure according to claim 7, further comprising:

determining the preset value by measuring the energy needed to expose a cell at an initial installation of the exposure device.

13. A method for calculating a transmission utility factor value of photo energy of an exposure device, comprising the steps of:

dividing a wafer into a plurality of cells;

determining an energy value used to expose the cell with a laser;

calculating a total number of laser pulses generated from a laser generator in order to expose the cell;

calculating an energy value of each pulse;

multiplying the total number of laser pulses by the energy value of each pulse to determine an energy value generated by the laser to expose the cell;

calculating a photo energy transmission utility factor value by comparing the energy value used to expose the cell with the energy value generated by the laser to expose the cell;

comparing the photo energy transmission utility factor value with a preset value; and determining that the optical system is contaminated when the photo energy transmission utility factor value decreases from the preset value by more than a preset amount.

14. The method for calculating a transmission utility factor value of photo energy for exposure according to claim 13, wherein:

the preset amount is 10%.

15. The method for calculating a transmission utility factor value of photo energy for exposure according to claim 13, wherein:

the preset amount is 20%.

16. The method for calculating a transmission utility factor value of photo energy for exposure according to claim 13, wherein:

the preset amount is 30%.

17. The method for calculating a transmission utility factor value of photo energy for exposure according to claim 13, further comprising calculating the energy value used to expose the cell with a server.

18. The method for calculating a transmission utility factor value of photo energy for exposure according to claim 13, further comprising:

determining the preset value by measuring the energy needed to expose a cell at an initial installation of the exposure device.

* * * * *